United States Patent
Liu

(10) Patent No.: US 9,385,968 B2
(45) Date of Patent: Jul. 5, 2016

(54) METHODS AND DEVICES FOR CONNECTING TO MULTIPLE INTERFACES

(71) Applicant: Delta Networks, Inc., Taoyuan County (TW)

(72) Inventor: Tsung Han Liu, Taoyuan County (TW)

(73) Assignee: DELTA NETWORKS, INC., Taoyuan City (TW)

( * ) Notice: Subject to any disclaimer, the term of this patent is extended or adjusted under 35 U.S.C. 154(b) by 154 days.

(21) Appl. No.: 14/508,543

(22) Filed: Oct. 7, 2014

(65) Prior Publication Data

US 2015/0207762 A1    Jul. 23, 2015

(30) Foreign Application Priority Data

Jan. 17, 2014  (TW) .............................. 103101734 A

(51) Int. Cl.
*H04L 12/935* (2013.01)
*H04L 12/741* (2013.01)
*H04L 29/06* (2006.01)

(52) U.S. Cl.
CPC ............ *H04L 49/3009* (2013.01); *H04L 45/74* (2013.01); *H04L 69/18* (2013.01); *H04L 69/22* (2013.01)

(58) Field of Classification Search
CPC ... H04L 649/3009; H04L 69/22; H04L 69/18; H04L 45/74
See application file for complete search history.

(56) References Cited

U.S. PATENT DOCUMENTS

2004/0044744 A1*  3/2004  Grosner .................. H04L 29/06
709/217

* cited by examiner

*Primary Examiner* — Jianye Wu
(74) *Attorney, Agent, or Firm* — Muncy, Geissler, Olds & Lowe, P.C.

(57) ABSTRACT

Methods and devices for connecting to multiple interfaces are provided. The method includes: receiving, by a client managing unit, a first data and a connection request transmitted from a first client device, wherein the connection request is used to request to connect to a first remote device; determining, by a remote device managing unit, an interface protocol of an interface controller of the first remote device according to the connection request, and transmitting the first data to an interface protocol processing unit corresponding to the interface protocol; and adding, by the interface protocol processing unit, a header corresponding to the interface controller of the first remote device to the first data and transmitting the first data adding the header to the first remote device through the interface controller.

20 Claims, 4 Drawing Sheets

METHODS AND DEVICES FOR CONNECTING TO MULTIPLE INTERFACES

CROSS REFERENCE TO RELATED APPLICATIONS

This Application claims priority of Taiwan Patent Application No. 103101734, filed on Jan. 17, 2014, the entirety of which is incorporated by reference herein.

BACKGROUND OF THE INVENTION

1. Field of the Invention

The present invention relates to methods and devices for connecting to multiple interfaces, and in particular to the methods and devices which are used to unify access manners using different communication interfaces.

2. Description of the Related Art

When a system uses a device using different communication techniques, a client device has to access different communication interfaces or interface controllers, for communicating with remote devices. Therefore, the communication software executed by the client device needs to be developed according to different communication interfaces. However, the development process for developing communication software according to different communication interfaces is complicated and inefficient.

In some cases, when the client device executes communication software to access a remote device, the client device has to package data and an address of the remote device into a packet conforming to a format used by the interface controller, and then transmits the packaged packet to a local interface controller. In this case, the client device does not communicate with the remote device directly by using a point-to-point communication manner, the client device specifies the address or the name of the remote device in the communication packet instead. In the software development, the protocols used by the interface controller has to be known when developing the communications software, therefore the client device may access the corresponding remote device. However, the manner described above can increase development time and reduce efficiency of use.

BRIEF SUMMARY OF THE INVENTION

A detailed description is given in the following embodiments with reference to the accompanying drawings.

Methods and devices for connecting to multiple interfaces are provided.

In one exemplary embodiment, the invention is directed to a device for connecting to multiple interfaces. The device for connecting to multiple interfaces comprises a client managing unit, a remote device managing unit and an interface protocol processing unit. The client managing unit is configured to receive a first data and a connection request transmitted from a first client device, wherein the connection request is used to request to connect to a first remote device. The remote device managing unit is connected to the client managing unit and configured to determine an interface protocol of an interface controller connected to the first remote device according to the connection request, and transmit the first data to the interface protocol processing unit corresponding to the interface protocol. The interface protocol processing unit is connected to the remote device managing unit and configured to add a header corresponding to the interface controller connected to the first remote device to the first data and transmit the first data including the header to the first remote device through the interface controller.

In one exemplary embodiment, the invention is directed to a method for connecting to multiple interfaces. The method comprises: receiving, by a client managing unit, a first data and a connection request transmitted from a first client device, wherein the connection request is used to request to connect to a first remote device; determining, by a remote device managing unit, an interface protocol of an interface controller connected to the first remote device according to the connection request, and transmitting the first data to an interface protocol processing unit corresponding to the interface protocol; and adding, by the interface protocol processing unit, a header corresponding to the interface controller connected to the first remote device to the first data and transmitting the first data including the header to the first remote device through the interface controller.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
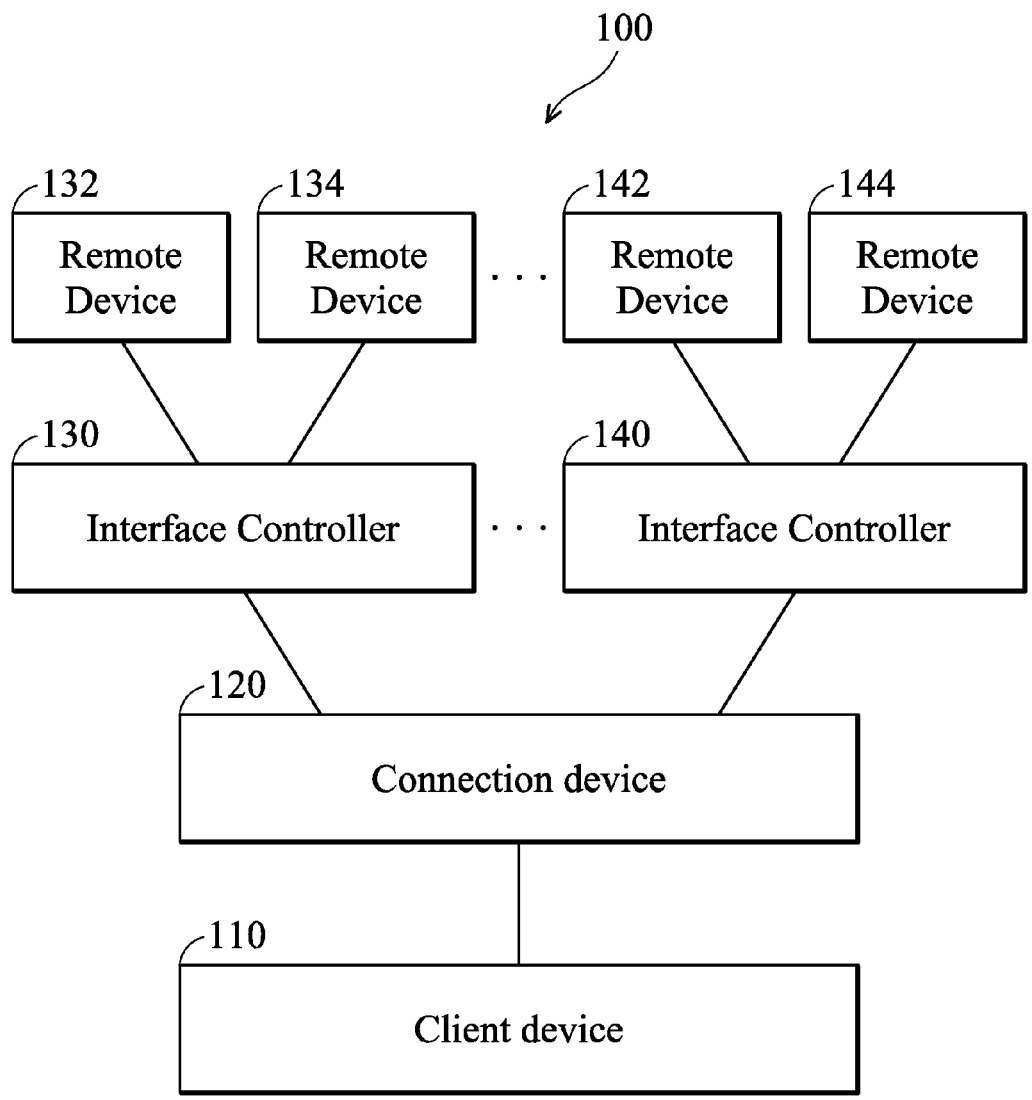
FIG. 1 is a schematic diagram of a communications system according to an embodiment of the present invention.

Several exemplary embodiments of the application are described with reference to FIGS. 1 through 4, which generally relate to navigation of a method and device for connecting to multiple interfaces. It should be understood that the following disclosure provides various different embodiments as examples for implementing different features of the application. Specific examples of components and arrangements are described in the following to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

FIG. 1 is a schematic diagram of a communications system 100 according to an embodiment of the present invention. The communications system 100 comprises a client device 110, a connection device 120 used to connect the client device 110 to multiple interfaces, one or more than one interface controller 130, 140 and one or more than one remote devices 132, 134, 142 and 144. The client device 110 may be a device or system for performing a communication program. The connection device 120 may be applied in at least one physical device, such as servers, workstations, a variety of computers and other devices. The interface controller 130 and 140 and the remote device 132, 134, 142 and 144 can be devices which use different communication technologies (for example, power line communication (PLC), ZigBee). It should be noted that the number of client devices, interface controllers, remote devices, and so on in the invention is not limited.

Figure 2:
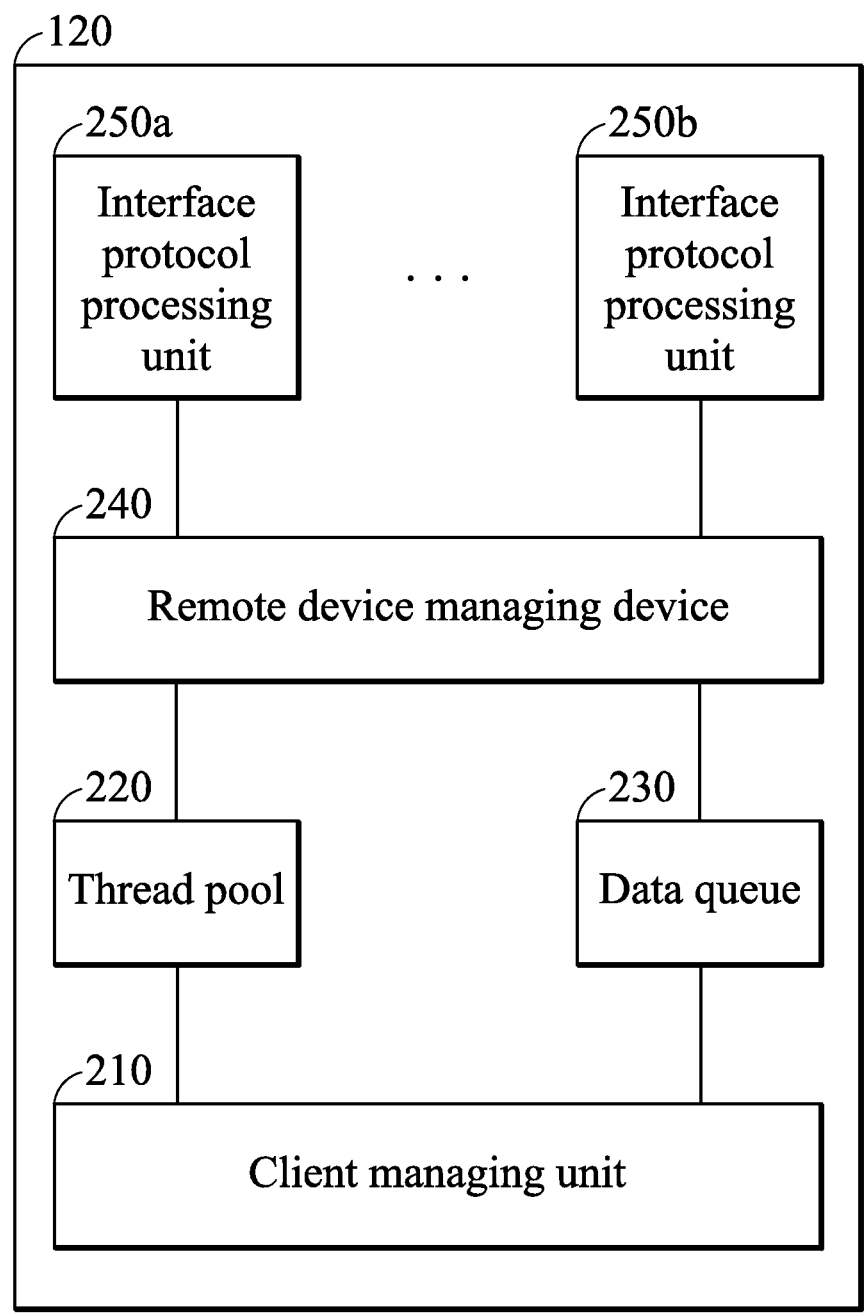
FIG. 2 is a schematic diagram of a connection device according to an embodiment of the present invention with reference to FIG. 1.

FIG. 2 is a schematic diagram of a connection device 120 according to an embodiment of the present invention with reference to FIG. 1. The connection device 120 comprises a client managing unit 210, a thread pool 220, a data queue 230, a remote device managing device 240 and one or more than one interface protocol processing unit 250*a*, 250*b*. It should be noted that the number of interface protocol processing units in the invention is not limited.

The client managing unit 210 is used to manage the connections between the connection device 120 and the client device 110, wherein the client managing unit 210 can also provide a function whereby a plurality of client devices 110 are connected simultaneously to the connection device 120. The thread pool 220 is connected to the remote device managing unit 240 and the client managing unit 210, and is used to perform multi-threaded management for connecting the remote device 132, 134, 142 and 144 with the client managing unit 210 and transferring the data between the remote devices and the client managing unit. The data queue 230 is connected to the remote device managing unit 240 and the client managing unit 210 and is used to store all the data transmitted by the client device 110 and the remote device 132, 134, 142 and 144 temporarily for performing asynchronous communication. The interface protocol processing unit 250*a* and 250*b* are connected to different interface controllers 130 and 140 with different interface protocols, respectively, and add respective headers to respective data according to interface protocols of different interface controllers 130 and 140, and transmit the data including the respective headers to the corresponding interface controllers, or transmit the respective data to the remote device managing unit 240 after removing the respective headers of the data transmitted by the remote controller 130, 140. In the embodiment, each interface controller corresponds to a respective protocol processing unit.

The remote device managing unit 240 has a list of devices. The remote device managing unit 240 manages remote devices provided by all the interface controllers and records all the remote devices to provide a basis for connection management, and controls access of the remote devices, for example, session management. In addition, the remote device managing unit 240 can also detect whether a new interface controller and remote device connected to the connection device 120, and records the new interface controller and remote device to the list of devices.

As shown, the client managing unit 210 receives a first data and a connection request transmitted from the client device 110, wherein the connection request is used to request to connect to a remote device 132. After the remote device 132 receives the connection request, the remote device 132 transmits an acknowledgement message back to the client device 110 to inform the client device 110 of the connection between the connection device 120 and the remote device 132 is completed. The remote device managing unit 240 is coupled to the client managing unit 210, and determinates an interface protocol of the interface controller 130 connected to the remote device 132 according to the connection request to transmit the first data to the interface protocol processing unit 250*a* corresponding to the interface protocol. The interface protocol processing unit 250*a* is connected to the remote device managing unit 240 and is used to add a header corresponding to the interface controller 130 to the first data and transmits the first data including the header to the remote device 132 through the interface controller 130. It should be noted that the first data may be a payload or other information.

In addition, after the interface protocol processing unit 250*a* receives a second data transmitted from the remote device 132 through the interface controller 130, the interface protocol processing unit 250*a* removes the header of the second data, and transmits the second data, whose the header has been removed, to the remote device managing unit 240. After the remote device managing unit 240 receives the second data, the remote device managing unit 240 transmits the second data whose the header has been removed to the client device 110 corresponding to the remote device according to the list of devices.

Figure 3:
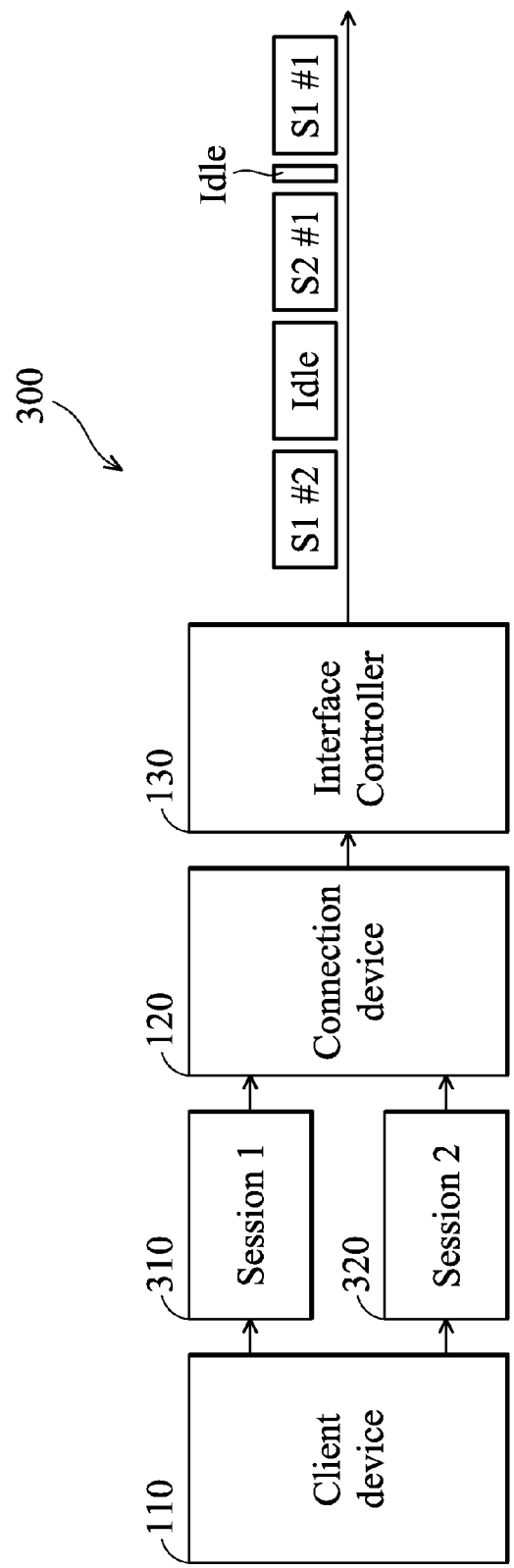
FIG. 3 is a schematic diagram 300 illustrating multiple sessions being transmitted to a remote device according to an embodiment of the present invention with reference to FIG. 1.

FIG. 3 is a schematic diagram 300 illustrating multiple sessions being transmitted to a remote device according to an embodiment of the present invention with reference to FIG. 1. As shown in FIG. 3, the client device 110 transmits a session 1 310 to the first remote device 132, and transmits a session 2 320 to the second remote device 134. First, after the client device 110 is connected to the first remote device 132, the client device 110 transmits a first part of the session 1 (S1 #1) to the first remote device 132. The remote device managing unit of the connection device 120 determines whether the interface controller 130 is in an idle state by the protocol processing unit. When the interface controller 130 is in the idle state, the protocol processing unit of the connection device 120 transmits the first part of the session 1 (S1 #1) to the interface controller 130. After the interface controller 130 transmits the first part of the session 1 (S1 #1) to the first remote device 132, the interface controller 130 returns to the idle state.

When the client device 110 transmits a first part of the session 2 (S2 #1) to the first remote device 132, if the client device 110 has transmitted the first part of the session 1 (S1 #1) but does not transmit the remaining part of the session 1 to the first remote device 132 through the interface controller 130, the remote device managing unit of the connection device 120 determines whether the interface controller 130 is in the idle state. When the interface controller 130 is in the idle state, the protocol processing unit of the connection 120 transmits a first part of the session 2 (S2 #1) to the interface controller 130, and then the interface controller 130 transmits the first part of the session 2 (S2 #1) to the second remote device 134. After transmitting the first part of the session 2 (S2 #1) to the second remote device 134, the interface controller 130 returns to the idle state to transmit the remaining part of the subsequent sessions (S1 #2). It should be noted that, in another embodiment, the session 1 and the session 2 may also be transmitted by different client devices.

Figure 4:
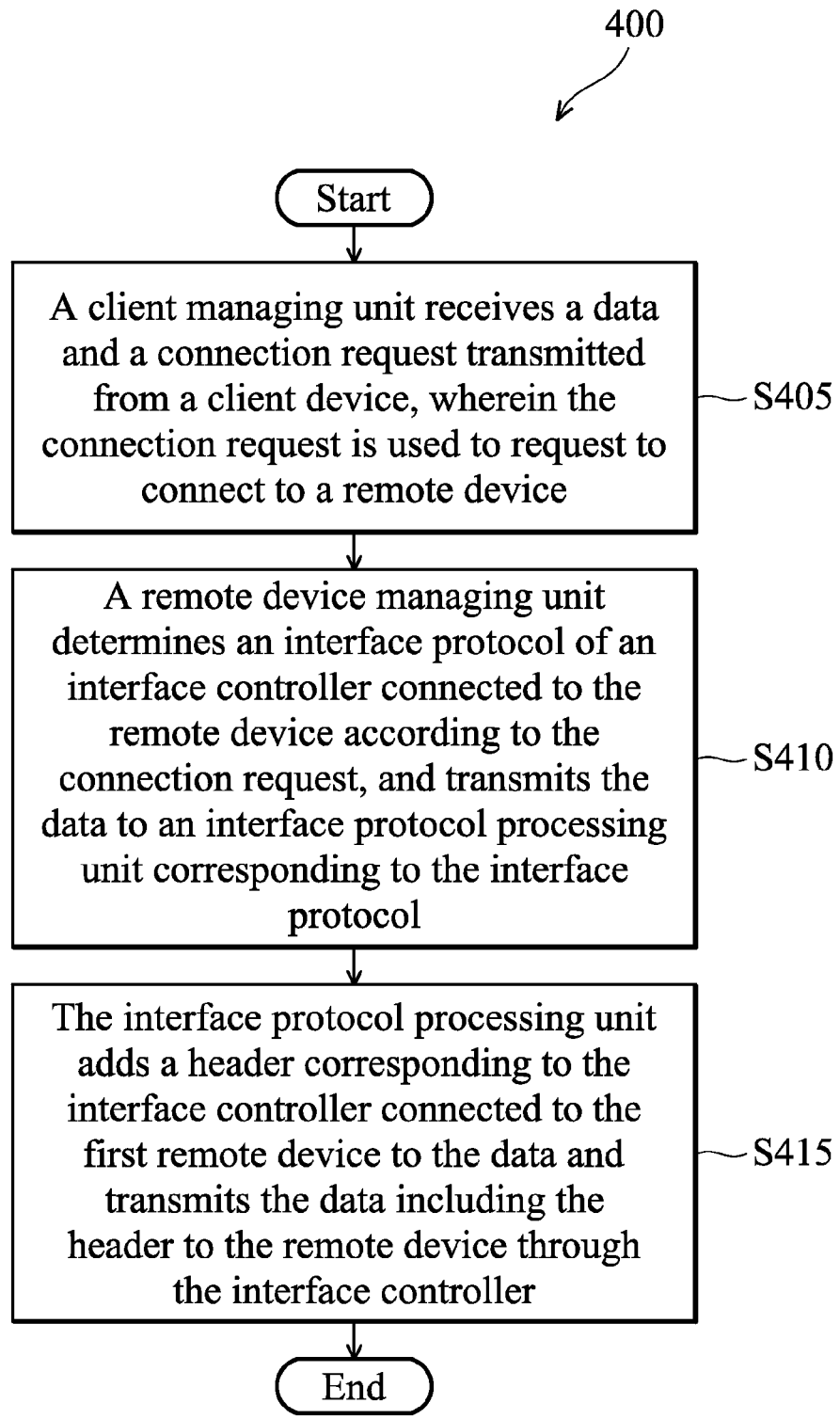
FIG. 4 is a flow diagram illustrating a method for connecting to multiple interfaces according to an embodiment of the present invention.

FIG. 4 is a flow diagram 400 illustrating a method for connecting to multiple interfaces according to an embodiment of the present invention. First, in step S405, a client managing unit receives a data and a connection request transmitted from a client device, wherein the connection request is used to request to connect to a remote device. Then, in step S410, a remote device managing unit determines an interface protocol of an interface controller connected to the remote device according to the connection request, and transmits the data to an interface protocol processing unit corresponding to the interface protocol. Finally, in step S415, the interface protocol processing unit adds a header corresponding to the interface controller connected to the first remote device to the data and transmits the data including the header to the remote device through the interface controller.

In one embodiment, the device for connecting to multiple interfaces described in the present invention can be applied in an automated meter reading system. When the client device is connected simultaneously to two remote devices (a Power Line Communication (PLC) meter and a ZigBee meter), the client device can execute the same program to read different meters through the device for connecting to multiple interfaces. In addition, when the client device is waiting for a response from the meter (namely, the interface controller is in the idle state), the client device can read another meter for utilizing available communication bandwidth efficiently.

In another embodiment, the device for connecting to multiple interfaces described in the present invention may be applied in a control system for street lights, wherein the street lights can be controlled by the PLC and the ZigBee, respectively. When the client device is simultaneously connected to two remote devices (a street light A and a street light B), the client device may execute the same program to control the street light A and the street light B through the device for connecting to multiple interfaces. For example, when the client device adjusts the brightness of the street light A, the client device A can turn off the street light B at the same time to control the lights effectively.

In another embodiment, the device for connecting to multiple interfaces described in the present invention may be applied in an industrial automation system. The industrial automation system uses a ZigBee connection management system. When the system detects that an abnormal event occurs in a machine located in a remote terminal, the system can transmit an alert message by the device for connecting to multiple interfaces to a human-machine interface (HMI) and can transmit a signal indicating to stop running the machine at the same time to shorten the time of issuing the alert message.

Therefore, there is no need for the client device to wait for the session occupying the same bandwidth to be completed. The client device may access different remote devices using the same interface controller simultaneously to increase the bandwidth utilization rate. In addition, the device for connecting to multiple interfaces described in the present invention may be used collectively to manage different interface controllers to increase throughput of the overall system. If the device of the present invention and the interfaces are installed in an original platform and the client device, the client device can support multiple communications and one-to-many communications to access the corresponding remote devices without knowing the protocols used by the interface devices used by the controller.

Methods and devices for connecting to multiple interfaces may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A device for connecting to multiple interfaces, comprising:
   a client managing unit, configured to receive a first data and a connection request transmitted from a first client device, wherein the connection request is used to request to connect to a first remote device;
   a remote device managing unit, connected to the client managing unit and configured to determine an interface protocol of an interface controller connected to the first remote device according to the connection request, and transmit the first data to an interface protocol processing unit corresponding to the interface protocol; and
   the interface protocol processing unit, connected to the remote device managing unit and configured to add a header corresponding to the interface controller connected to the first remote device to the first data and transmit the first data including the header to the first remote device through the interface controller.

2. The device for connecting to multiple interfaces as claimed in claim 1, wherein the client managing unit receives a first part of a first session; the remote device managing unit determines whether the interface controller is in an idle state through the interface protocol processing unit; and when the interface controller is in the idle state, the interface protocol processing unit transmits the first part of the first session to the first remote device through the interface controller.

3. The device for connecting to multiple interfaces as claimed in claim 1, wherein the client managing unit receives a first part of a second session transmitted from a second client device; when the first client device has transmitted the first part of the first session to the first remote device and has not transmitted a remaining part of the first session, the remote device managing unit determines whether the interface controller is in the idle state; and when the interface controller is in the idle state, the interface protocol processing unit transmits the first part of the second session to a second remote device through the interface controller.

4. The device for connecting to multiple interfaces as claimed in claim 3, wherein the first client device is the second client device.

5. The device for connecting to multiple interfaces as claimed in claim 1, wherein the remote device managing unit has a list of devices used to record first remote devices connected to the first client device.

6. The device for connecting to multiple interfaces as claimed in claim 5, wherein the interface protocol processing unit receives a second data transmitted from the first remote device through the interface controller and removes a header of the second data; the remote device managing unit transmits the second data whose the header has been removed to the first client device corresponding to the first remote device according to the list of devices.

7. The device for connecting to multiple interfaces as claimed in claim 5, wherein the remote device managing unit detects whether there is any new interface controller and remote device connected to the remote device managing unit regularly and records the new interface controller and remote device into the list of devices.

8. The device for connecting to multiple interfaces as claimed in claim 1, further comprising:
a thread pool, connected to the remote device managing unit and the client managing unit and configured to manage multiple threads.

9. The device for connecting to multiple interfaces as claimed in claim 1, further comprising:
a data queue, connected to the remote device managing unit and the client managing unit and configured to store all the data transmitted from the client device and the remote device temporarily.

10. The device for connecting to multiple interfaces as claimed in claim 1, wherein the first data is a payload.

11. A method for connecting to multiple interfaces, comprising:
receiving, by a client managing unit, a first data and a connection request transmitted from a first client device, wherein the connection request is used to request to connect to a first remote device;
determining, by a remote device managing unit, an interface protocol of an interface controller connected to the first remote device according to the connection request, and transmitting the first data to an interface protocol processing unit corresponding to the interface protocol; and
adding, by the interface protocol processing unit, a header corresponding to the interface controller connected to the first remote device to the first data and transmitting the first data including the header to the first remote device through the interface controller.

12. The method for connecting to multiple interfaces as claimed in claim 11, further comprising:
receiving, by the client managing unit, a first part of a first session;
determining, by the remote device managing unit, whether the interface controller is in an idle state; and
transmitting, by the interface protocol processing unit, the first part of the first session to the first remote device through the interface controller when the interface controller is in the idle state.

13. The method for connecting to multiple interfaces as claimed in claim 12, further comprising:
receiving, by the client managing unit, a first part of a second session transmitted from a second client device;
determining, by the remote device managing unit, whether the interface controller is in the idle state when the first client device has transmitted the first part of the first session to the first remote device and has not transmitted a remaining part of the first session; and
transmitting, by the interface protocol processing unit, the first part of the second session to a second remote device through the interface controller.

14. The method for connecting to multiple interfaces as claimed in claim 13, wherein the first client device is the second client device.

15. The method for connecting to multiple interfaces as claimed in claim 11, further comprising:
recording, by the remote device managing unit, first remote devices connected to the first client device in a list of devices.

16. The method for connecting to multiple interfaces as claimed in claim 15, further comprising:
receiving, by the interface protocol processing unit, a second data transmitted from the first remote device through the interface controller;
removing, by the interface protocol processing unit, a header of the second data;
transmitting, by the remote device managing unit, the second data whose the header has been removed to the first client device corresponding to the first remote device according to the list of devices.

17. The method for connecting to multiple interfaces as claimed in claim 15, further comprising:
detecting, by the remote device managing unit, whether there is any new interface controller and remote device connected to the remote device managing unit regularly and recording the new interface controller and remote device into the list of devices.

18. The method for connecting to multiple interfaces as claimed in claim 11, further comprising:
managing, by a thread pool, multiple threads.

19. The method for connecting to multiple interfaces as claimed in claim 11, further comprising:
storing, by a data queue, all the data transmitted from the client device and the remote device temporarily.

20. The method for connecting to multiple interfaces as claimed in claim 11, wherein the first data is a payload.

* * * * *